US009416751B2

(12) United States Patent
Jones et al.

(10) Patent No.: US 9,416,751 B2
(45) Date of Patent: Aug. 16, 2016

(54) ACTUATION SYSTEM

(75) Inventors: Teddy L. Jones, Cherry Valley, IL (US); Gregory T. Wallen, Roscoe, IL (US); Kevin Gibbons, Torrington, CT (US); William E. Villano, Canton, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 1254 days.

(21) Appl. No.: 12/962,158

(22) Filed: Dec. 7, 2010

(65) Prior Publication Data

US 2012/0137656 A1 Jun. 7, 2012

(51) Int. Cl.
*F02K 1/72* (2006.01)
*F02K 1/76* (2006.01)

(52) U.S. Cl.
CPC ............... *F02K 1/763* (2013.01); *Y02T 50/671* (2013.01); *Y10T 29/49826* (2015.01); *Y10T 74/19698* (2015.01); *Y10T 74/19744* (2015.01)

(58) Field of Classification Search
CPC ................................ F02K 1/763; F02K 1/766
USPC ...................... 60/226.2; 244/110 B; 74/89.29
See application file for complete search history.

(56) References Cited

U.S. PATENT DOCUMENTS 2,403,092 A * 7/1946 Lear ........................ B64C 25/24 74/89.26
2,765,024 A * 10/1956 Brundage ............ B60N 2/0224 74/89.28
3,802,281 A * 4/1974 Clarke ................ F16H 25/2021 74/89.38
4,068,469 A * 1/1978 Adamson .................. F02K 1/16 60/226.1
4,436,278 A * 3/1984 Smith ..................... F16K 31/05 74/625
4,459,867 A * 7/1984 Jones .................. F16H 25/2021 74/89.38
4,779,799 A * 10/1988 Jencek .................... F02K 9/976 74/89.29
4,865,256 A 9/1989 Durand et al.
4,876,906 A * 10/1989 Jones ...................... B64C 13/42 74/89.25
5,144,851 A * 9/1992 Grimm .................. B64C 13/36 74/89.26
5,628,234 A * 5/1997 Crook ..................... B64C 13/42 74/665 B
5,655,360 A 8/1997 Butler
5,778,659 A 7/1998 Duesler et al.
5,806,302 A 9/1998 Cariola et al.
5,863,014 A 1/1999 Standish
6,170,254 B1 1/2001 Cariola
6,526,744 B2 3/2003 Ahrendt
6,735,936 B2 5/2004 Rey et al.
7,127,880 B2 * 10/2006 Lair et al. ........................ 60/204
7,190,096 B2 * 3/2007 Blanding ................ B64C 13/00 74/89.26
8,511,062 B2 * 8/2013 Ramlaoui ................. F02K 1/09 60/226.2
8,616,080 B2 * 12/2013 Flatt ....................... B64C 13/50 74/89.38
2009/0013664 A1 * 1/2009 Jones et al. ..................... 60/228
2009/0193789 A1 8/2009 Pero
2009/0226305 A1 9/2009 Wong et al.
2010/0205931 A1 * 8/2010 Baudu ...................... F02K 1/72 74/89
2010/0229528 A1 * 9/2010 Ramlaoui et al. ............ 60/226.2

* cited by examiner

*Primary Examiner* — Ted Kim
(74) *Attorney, Agent, or Firm* — Kinney & Lange, P.A.

(57) ABSTRACT

A system to provide differential movement between a first surface, a second surface and a fixed surface includes a first surface movable between a first position and a second position; a second surface movable with the first surface and further movable beyond the first surface; a shaft connected to the second surface to move the second surface; and a drive unit connected to the fixed surface to drive the shaft to move the second surface relative to the first surface and to allow the shaft to move through the drive unit when the second surface is being moved by the first surface.

16 Claims, 4 Drawing Sheets

ACTUATION SYSTEM

CROSS-REFERENCE TO RELATED APPLICATION(S)

This application is related to U.S. application Ser. No. 12/962,140, titled POSITION DETECTING SYSTEM and filed on Dec. 7, 2010, which is herein incorporated by reference.

BACKGROUND

Jet engines typically include movable parts, which can be moved outward or retracted at various times through a flight. These movable parts are typically moved through actuation systems of various types.

The thrust reverser system of an engine may include a number of such movable parts. Generally a thrust reverser system includes two thrust reverser doors. The thrust reverser doors are actuated independently, and are located on each side of the engine, one on the right side and one on the left side. Each thrust reverser door assembly further may include a variable area fan nozzle ("VAFN") door which needs to be able to move with the thrust reverser door, and further be able to translate beyond the movements with the thrust reverser door. This is sometimes done by attaching a gearbox and motor assembly to the thrust reverser door assembly translating frame.

SUMMARY

A system to provide differential movement between a first surface, a second surface and a fixed surface includes a first surface movable between a first position and a second position; a second surface movable with the first surface and further movable beyond the first surface; a shaft connected to the second surface to move the second surface; and a drive unit connected to the fixed surface to drive the shaft to move the second surface relative to the first surface and to allow the shaft to move through the drive unit when the second surface is being moved by the first surface.

DETAILED DESCRIPTION

Figure 1A:
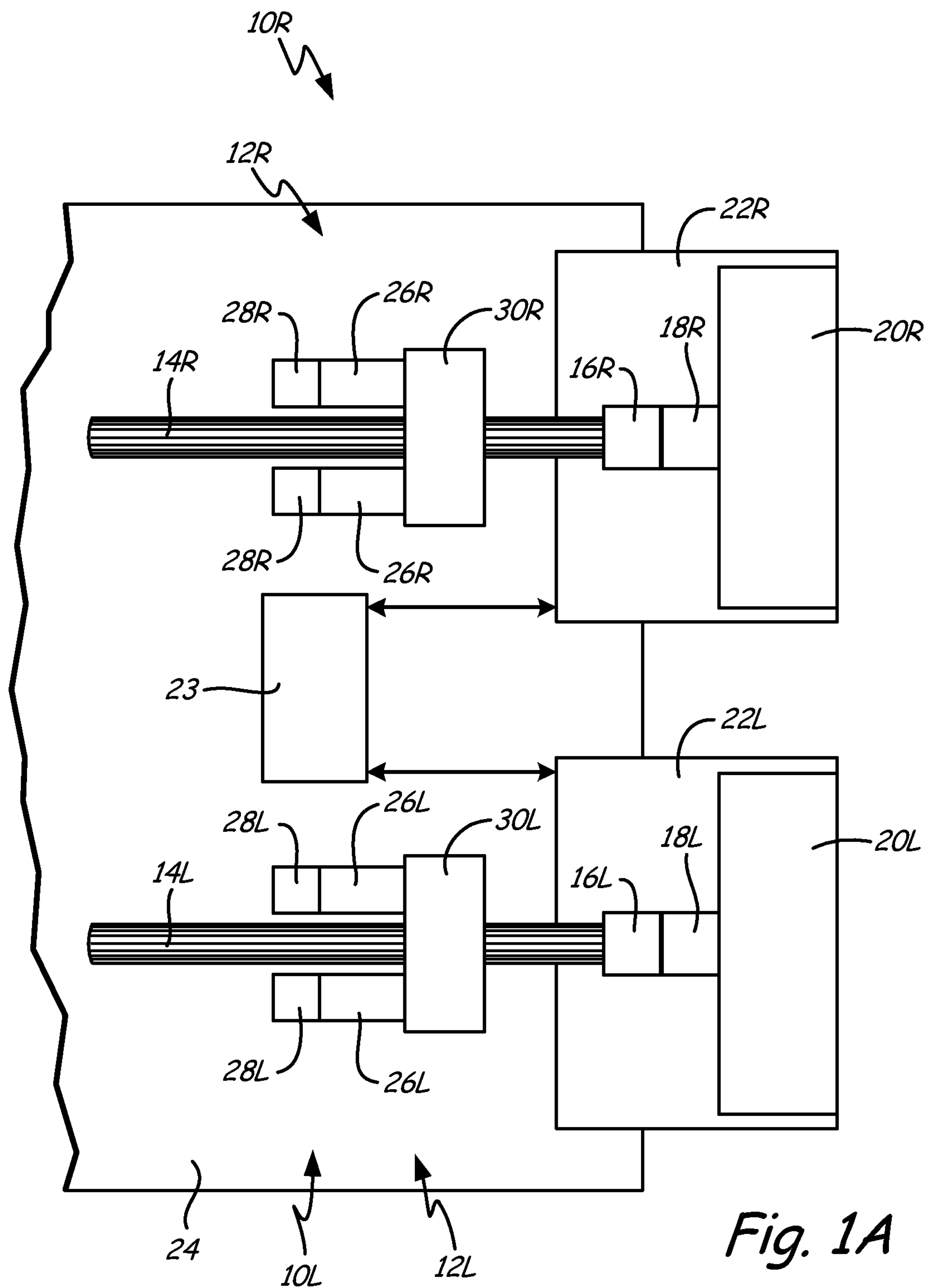
FIG. 1A is a block diagram of an actuation system according to an embodiment of the current invention where the thrust reverser door and the VAFN door are closed.

FIG. 1A is a block diagram of an actuation system according to an embodiment of the current invention where the thrust reverser door and the VAFN door are closed. FIG. 1A includes left and right actuation systems 10L, 1 OR (with drive units 12L, 12R, shafts 14L, 14R, collars 16L, 16R, ballscrews 17L, 17R, and ball nuts 18L, 18R), VAFN doors 20L, 20R, thrust reverser door assembly 22L, 22R, respectively; thrust reverser door drive unit 23; and fixed structure

24. Drive units 12L, 12R include motors 26L, 26R, brakes 28L, 28R; and summing boxes 30L, 30R, respectively. The upper part of the diagram represents the VAFN door 20R actuation system 10R on the thrust reverser door 22R on the right side of the engine, and the lower half of the diagram represents the VAFN door 20L actuation system 10L on the thrust reverser door 22L on the left side of the engine. The drawing is not to scale.

Brakes 28R, motors 26R, and summing box 30R of drive unit 12R are connected to fixed surface 24, which can be a nacelle. Brakes 28R are connected to motors 26R, and motors 26R are connected to summing box 30R. Shaft 14R is connected to summing box 30R, typically through a splined connection (not shown) or any connection that allows for shaft 14R to be driven by drive unit 12R and also allows shaft 14R to translate through drive unit 12R when thrust reverser door 22R is being moved. Thrust reverser door 22R is moved by thrust reverser door drive unit 23. Collar 16R is fixed to thrust reverser door 22R, and ball nut 18R is connected to VAFN door 20R. Shaft 14R connects to and drives collar 16R. Collar 16R drives ballscrew 17R (FIG. 1C) which drives ball nut 18R. VAFN door 20R connects to thrust reverser door 22R. Thrust reverser door 22R is driven by thrust reverser door drive unit 23. Left actuation system 10L is connected and works the same way, respectively, as right actuation system 10R.

Brakes 28R work to stop motors 26R when desired. Motors 26R connect to summing box 30R which sums the power produced by motors 26R to impart rotation to shaft 14R when desired. When rotation is imparted to shaft 14R by summing box 30R of drive unit, shaft 14R rotates through collar 16R, driving ballscrew 17R, which drives ball nut 18R, translating the rotational movement of shaft 14R into a linear movement for VAFN door 20R. Thrust reverser door 22R moves linearly through thrust reverser door drive unit 23. Because VAFN door 20R is connected to thrust reverser door 22R, VAFN door 20R moves with thrust reverser door 22R whenever thrust reverser door 22R is moved by thrust reverser door drive unit 23. When VAFN door is moving as a result of the translation of thrust reverser door 22R, summing box 30R (through the splined connection) allows shaft 14R to move left or right through summing box 30R.

The actuation system of the current invention allows for VAFN door 20R to move with thrust reverser door 22R and additionally be driven by drive unit 12R connected to fixed part 24 resulting in a more efficient and simple differential movement actuation system than prior art systems. Some past systems attempted to overcome challenges associated with being able to actuate the VAFN door while still allowing it to move with the thrust reverser door by attaching the actuation system to the thrust reverser door. This resulted in the thrust reverser door being much less efficient, having to carry the additional weight of the actuation system. It also presented challenges in accommodating the translating electrical wires (which provide the motor with electricity to run). Other systems would drive the VAFN door from the fixed structure, but would coordinate the actuation with the actuation of the thrust reverser door, resulting in a need to monitor and actuate multiple systems in concert. This presented challenges in the actuation systems having to be monitored closely to ensure they were both working and working together so no parts would be damaged if one was not, and required more power as both actuation systems had to be working for any type of movement. The actuation system of the current invention overcomes the challenges of past systems by actuating the VAFN door from a fixed surface and allowing the shaft to be driven by a drive unit but to also move freely through the drive unit when the VAFN door is moving with the thrust reverser door.

Figure 1B:
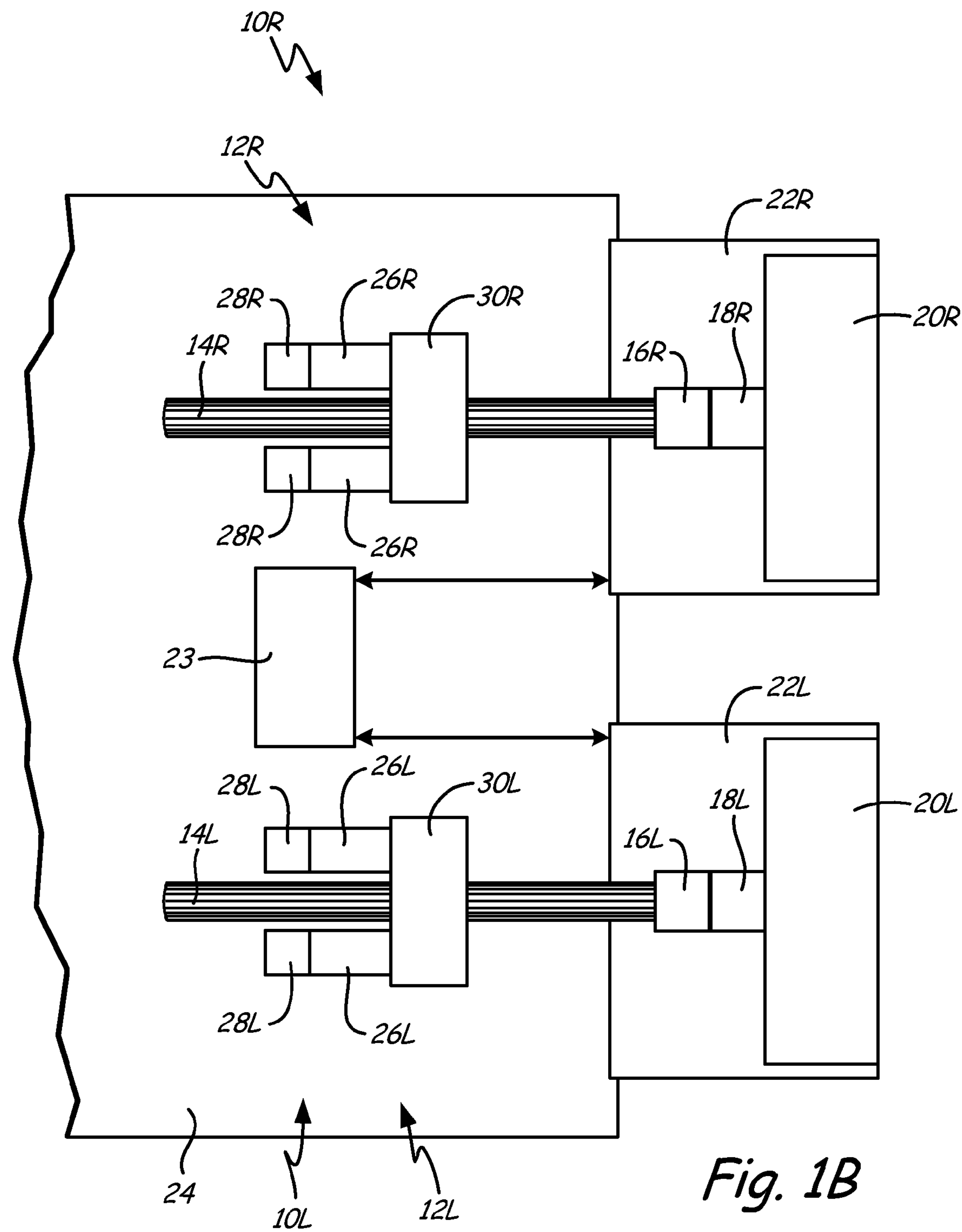
FIG. 1B is a block diagram of an actuation system of FIG. 1A with the thrust reverser door open and the VAFN door are closed.

FIG. 1B is a block diagram of an actuation system of FIG. 1A with the thrust reverser door open and the VAFN door are closed. The system includes left and right actuation systems 10L, 10R with drive units 12L, 12R (with motors 26L, 26R, brakes 28L, 28R; and summing boxes 30L, 30R); shafts 14L, 14R; collars 16L, 16R; ballscrews 17L, 17R; and ball nuts 18L, 18R. The system further includes VAFN doors 20L, 20R; thrust reverser door assembly 22L, 22R; thrust reverser door drive unit 23; and fixed structure 24.

Thrust reverser door 22R has been moved linearly relative to fixed structure 24 by thrust reverser drive unit 23. As VAFN door 20R is connected to thrust reverser door 22R, VAFN door 20R is moved passively with thrust reverser door 22R. Summing box 30R of drive unit 12R allows shaft 14R to move through summing box 30R to allow VAFN door 20R to move with thrust reverser door 22R. This passive movement through summing box 30R is allowed through using a splined connection within summing box 30R, such as a ball spline connection.

The connection between summing box 30R of drive unit 12R allows shaft 14R to translate through summing box 30R, thereby allowing VAFN door 20R to move passively with thrust reverser door 22R when thrust reverser door 22R is being actuated. This provides a more efficient system which saves energy by not needing to actively actuate VAFN door 20R to move with thrust reverser door 22R or to synchronize movement between the two. This savings in energy requirements results in economic savings in the overall system.

Figure 1C:
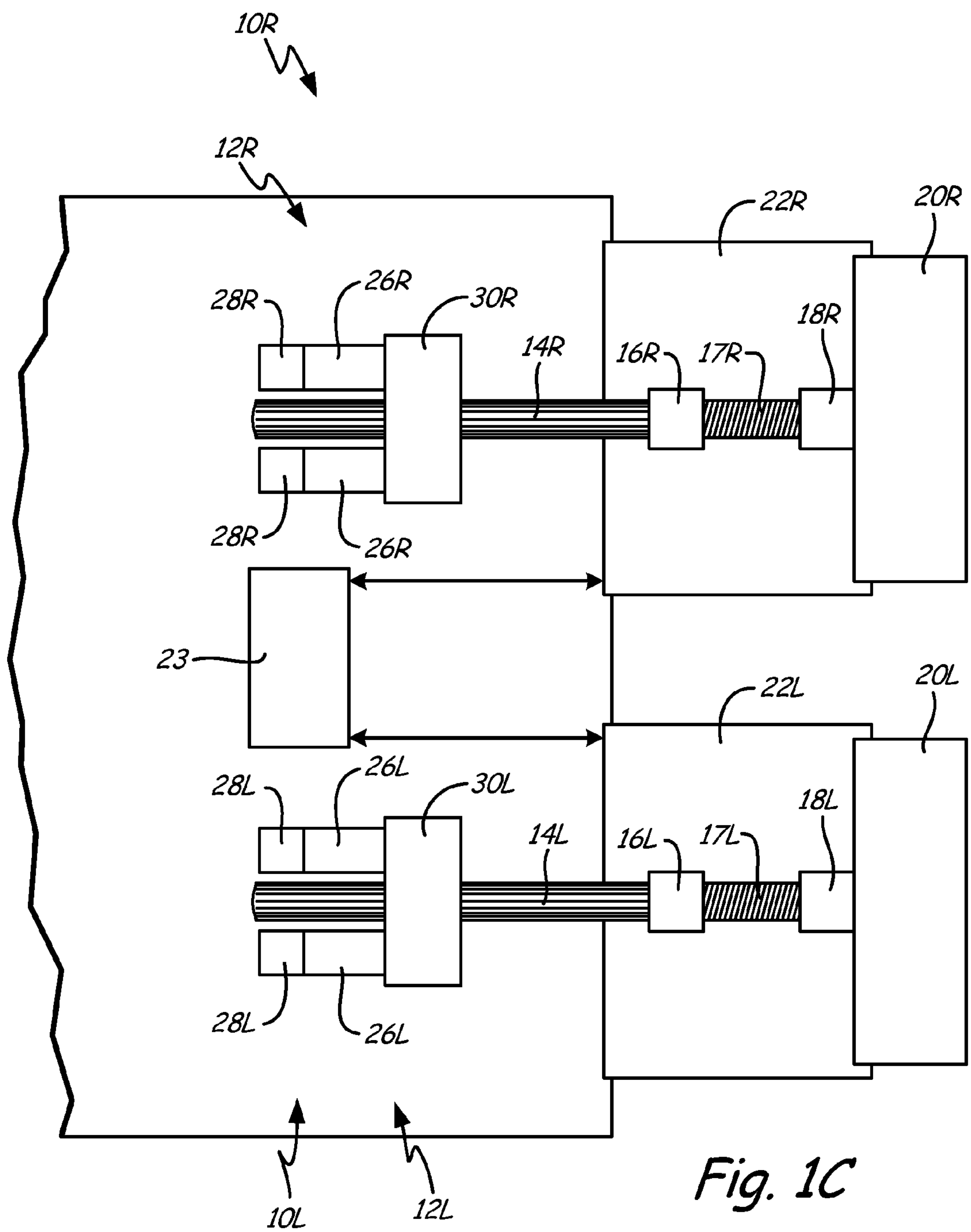
FIG. 1C is a block diagram of an actuation system of FIG. 1A with the thrust reverser door open and the VAFN door open.

FIG. 1C is a block diagram of an actuation system of FIG. 1A with the thrust reverser door open and the VAFN door open, and includes left and right actuation systems 10L, 10R (with drive units 12L, 12R including motors 26L, 26R, brakes 28L, 28R; and summing boxes 30L, 30R; shafts 14L, 14R; collars 16L, 16R; ballscrews 17L, 17R; and ball nuts 18L, 18R); VAFN doors 20L, 20R; thrust reverser door assembly 22L, 22R; thrust reverser door drive unit 23 and fixed structure 24.

Thrust reverser door 22R has been translated linearly by thrust reverser door drive unit 23, moving VAFN door 20R along with it. VAFN door 20R has been further extended through motors 26R and summing box 30R rotating shaft 14R. The rotation of shaft 14R is imparted to collar 16R, which drives ballscrew 17R. Ballscrew 17R then drives ball nut 18R, translating the rotational movement of shaft 14R into linear movement for VAFN door 20R.

The current system allows actuation assembly 10R to be connected to fixed structure 24 while still being able to translate VAFN door 20R when desired through shaft 14R being connected to a drive unit 12R through a splined connection. Connecting actuation system 10R to fixed structure provides it with more stability, and eliminates the challenges with providing electricity through wires to a drive unit that is fixed on a movable part such as the thrust reverser door 20R.

Figure 2:
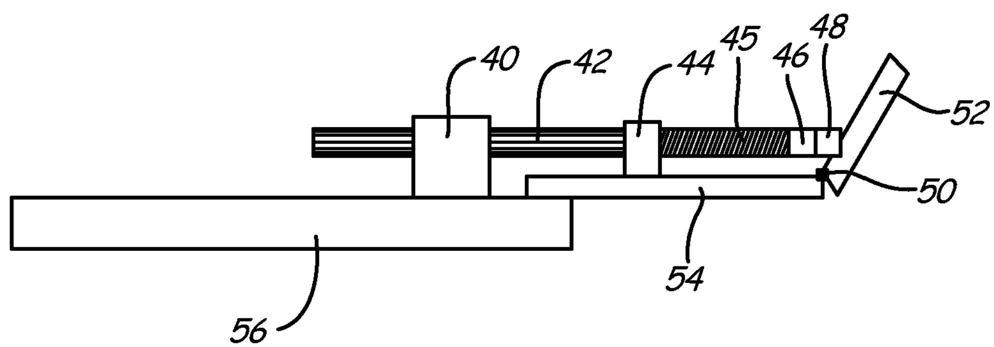
FIG. 2 is a block diagram of a side view of a second embodiment of an actuation system with a thrust reverser door open and a VAFN door pivoted open.

FIG. 2 is a block diagram of a side view of a second embodiment of an actuation system with a thrust reverser door open and a VAFN door pivoted open, and includes drive unit 40, shaft 42, collar 44, ballscrew 45, ball nut 46, cam 48, hinge 50, VAFN door 52, thrust reverser door 54, and fixed structure 56.

As in FIGS. 1A-1C, drive unit 40 is attached to fixed structure 56 and drives shaft 42. Drive unit 40 also allows shaft 42 to translate through drive unit 40 when VAFN door 52 is moving with thrust reverser door 54. When drive unit 40 is actuated, shaft 42 imparts rotational motion to collar 44, which imparts it to ballscrew 45. Ballscrew 45 then drives ball nut 46, which drives cam 48 to cause VAFN door 52 to pivot on hinge 50.

The embodiment shown in FIG. 2 provides for the same advantages of the embodiment of FIGS. 1A-1C, namely economic and efficiency advantages. FIG. 2 illustrates how the current invention can be used in a system where rotational movement is desired due to system design and components.

In summary, the current invention provides an actuation system that allows for differential surface movement with maximum efficiency and minimal parts by providing a drive unit connected to a shaft, where the connection allows the drive unit to both drive the shaft to translate a surface and allows for passive movement of the shaft through the drive unit when the surface is being moved by another surface. This results in being able to fix the actuation system to a fixed surface which provides stability and makes providing electricity to the drive unit easier (then if the drive unit were attached to a moving surface and translating wires were needed). This also results in an efficient system allowing for passive movement instead of having to separately actuate (and coordinate) each surface.

While the invention is discussed in terms of a drive unit comprising two motors and a summing box, other types of drive units which would be able to drive shaft 14 and also allow it to move through the drive unit (when VAFN door is being moved with thrust reverser door) could be used. For example, a drive unit consisting of only one motor could be used.

While the invention has been discussed in terms of actuating a VAFN door connected to a thrust reverser door assembly, it could be used on any system which required differential surface movement in connection with an actuation system. For example, it may be used on flap or slat systems on an aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. For example, the system could further include a sliding guide for the VAFN door. Therefore, it is intended that the invention not be limited to the particular embodiment(s) disclosed, but that the invention will include all embodiments falling within the scope of the appended claims.

The invention claimed is:

1. A system to provide differential movement between a thrust reverser door, a variable area fan nozzle door and a fixed surface, the system comprising:

a thrust reverser door movable between a first position and a second position, wherein a thrust reverser door drive system drives the thrust reverser door;

a variable area fan nozzle door movable with the thrust reverser door between the first position and the second position, and further movable between the second position and a third position;

a shaft connected to the variable area fan nozzle door to move the variable area fan nozzle door; and a drive unit connected to the fixed surface to drive the shaft to move the variable area fan nozzle door relative to the thrust reverser door, wherein the drive unit includes a motor and a summing gearbox, the thrust reverser door drive system being separate from the drive unit, wherein the shaft extends through and is coupled to the drive unit to allow the shaft to passively move in an axial direction through the summing gearbox of the drive unit when the variable area fan nozzle door is being moved by the thrust reverser door by the thrust reverser door drive system, wherein when the thrust reverser door is in the first position, a first end of the shaft extends outward from a first axial end of the drive unit, and a second end of the shaft extends outward from a second axial end of the drive unit.

2. The system of claim 1, wherein the shaft is coupled to the drive unit through a spline connection.

3. The system of claim 2, wherein the spline connection is a ball spline connection.

4. The system of claim 1, wherein the drive unit comprises a plurality of motors.

5. The system of claim 1, further comprising:

a collar connected to the shaft and fixed to the thrust reverser door; and a ball nut and ballscrew connected to the collar and the variable area fan nozzle door to translate rotational motion from the shaft and the collar into linear motion for the variable area fan nozzle door.

6. The system of claim 1, wherein the variable area fan nozzle door is rotationally movable.

7. The system of claim 6, and further comprising:

a cam connected to the variable area fan nozzle door to pivot the variable area fan nozzle door; and a hinge connecting the thrust reverser door to the variable area fan nozzle door.

8. The system of claim 1, wherein the thrust reverser door and the variable area fan nozzle door move in a linear direction.

9. The system of claim 1, wherein the drive unit comprises a plurality of brakes.

10. The system of claim 1, wherein the summing gearbox is configured to impart rotation to the shaft.

11. A method of producing a relational movement system to move a thrust reverser door relative to variable area fan nozzle door, the method comprising:

connecting the thrust reverser door to the variable area fan nozzle door wherein a thrust reverser door drive system drives the thrust reverser door;

fixing a drive unit to the fixed surface, wherein the drive unit includes a motor and a summing gearbox, the thrust reverser door drive system being separate from the drive unit;

connecting a shaft to the variable area fan nozzle door at a first end; and coupling the shaft to the drive unit at a second end so that the shaft extends through the drive unit with the first end of the shaft extending outward in a first axial direction from the drive unit and the second end of the shaft extending outward in a second axial direction from the drive unit, wherein the shaft is drivable by the drive unit to move the variable area fan nozzle door, and wherein the drive unit allows for the shaft to passively move axially through the summing gearbox of the drive unit when the variable area fan nozzle door moves with the thrust reverser door by the thrust reverser door drive system.

12. The method of claim 11, wherein the fixed surface is a nacelle.

13. The method of claim 11, wherein the shaft is coupled to the drive unit by a splined connection.

14. The method of claim 11, wherein the summing gearbox is configured to impart rotation to the shaft.

15. A system to drive a thrust reverser door relative to a variable area fan nozzle door from a fixed part, the system comprising:

a thrust reverser door movable between a first position and a second position, wherein a thrust reverser door drive system drives the thrust reverser door;

a variable area fan nozzle door connected to and movable with the thrust reverser door and further movable between the second position and a third position;

a drive unit fixed to the fixed part, wherein the drive unit includes a motor and a summing gearbox, the thrust reverser door drive system being separate from the drive unit;

a rotatable shaft connected to the variable area fan nozzle door and coupled to and extending through the summing gearbox of the drive unit to be rotated by the drive unit, and to allow for the shaft to passively move axially with respect to the drive unit when the thrust reverser door moves the variable area fan nozzle door by the thrust reverser door drive system, wherein when the thrust reverser door is in the first position, a first end of the rotatable shaft extends outward from a first axial end of the drive unit, and a second end of the rotatable shaft extends outward from a second axial end of the drive unit;

a collar connected to the thrust reverser door and the shaft; and a ball nut connected to the variable area fan nozzle door to translate rotational movement from the shaft into movement for the variable area fan nozzle door.

16. The system of claim 15, wherein the movement of the variable area fan nozzle door is pivotal movement.

* * * * *